Figure 1:
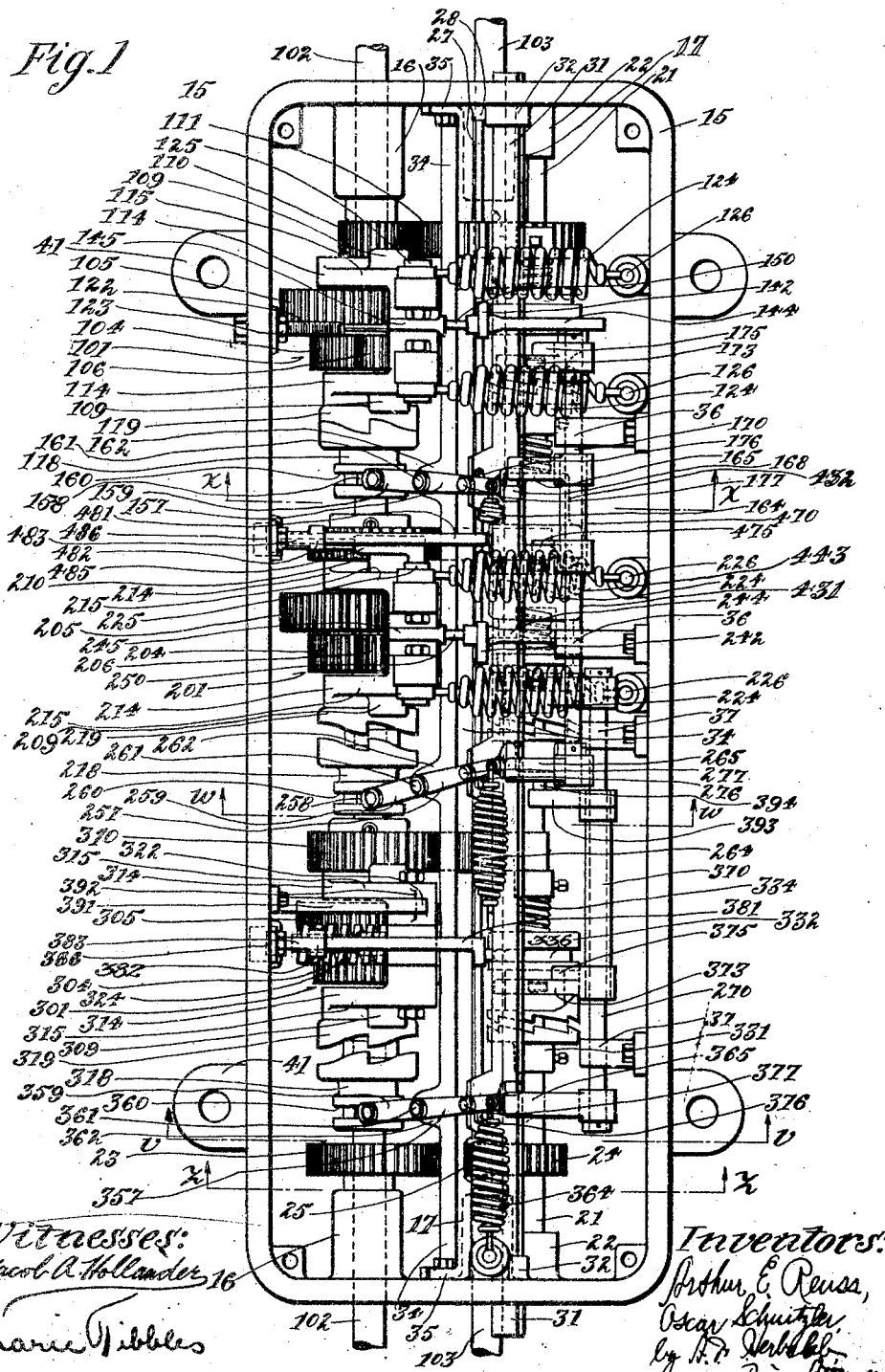

A. E. REUSS & O. SCHNITZLER.
GEARING.
APPLICATION FILED MAY 1, 1911.

1,034,145.

Patented July 30, 1912.

6 SHEETS—SHEET 1.

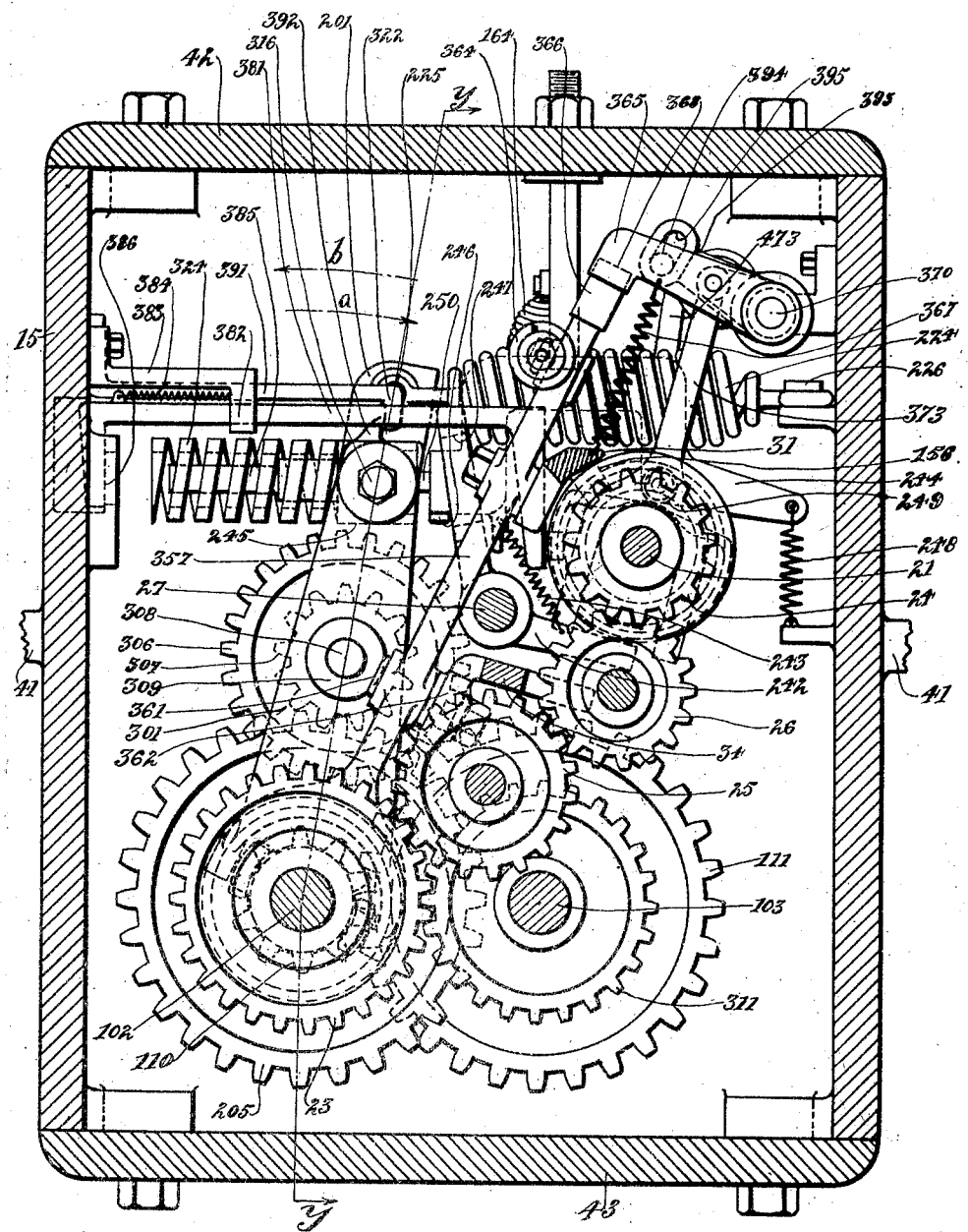

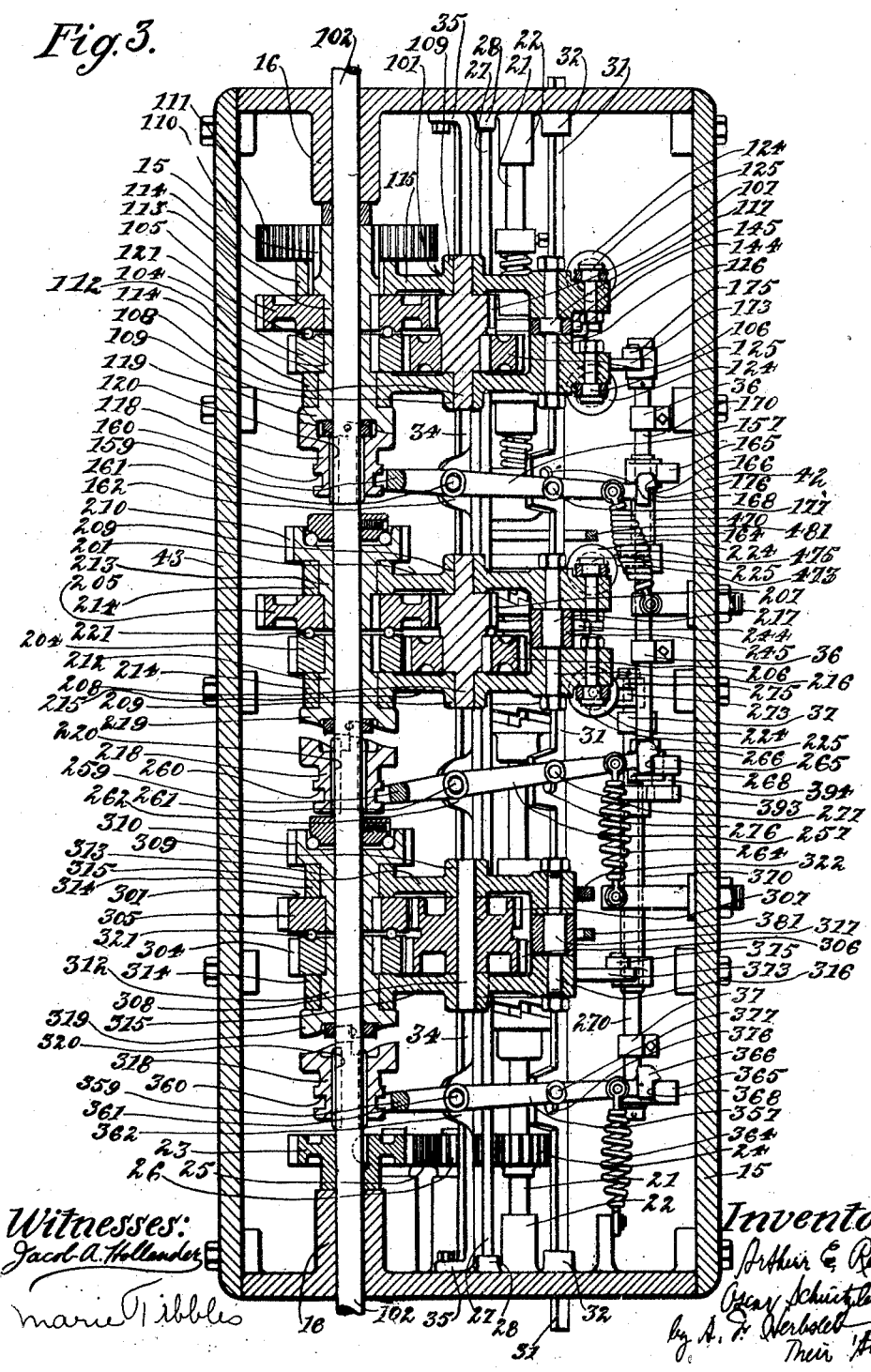

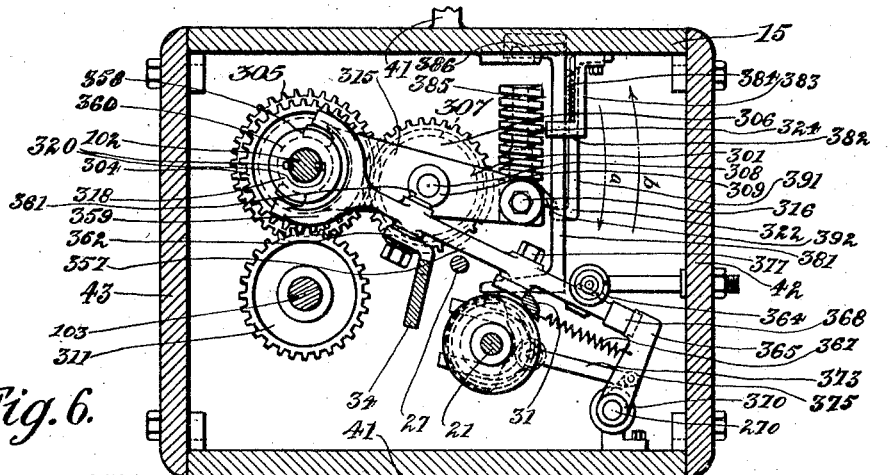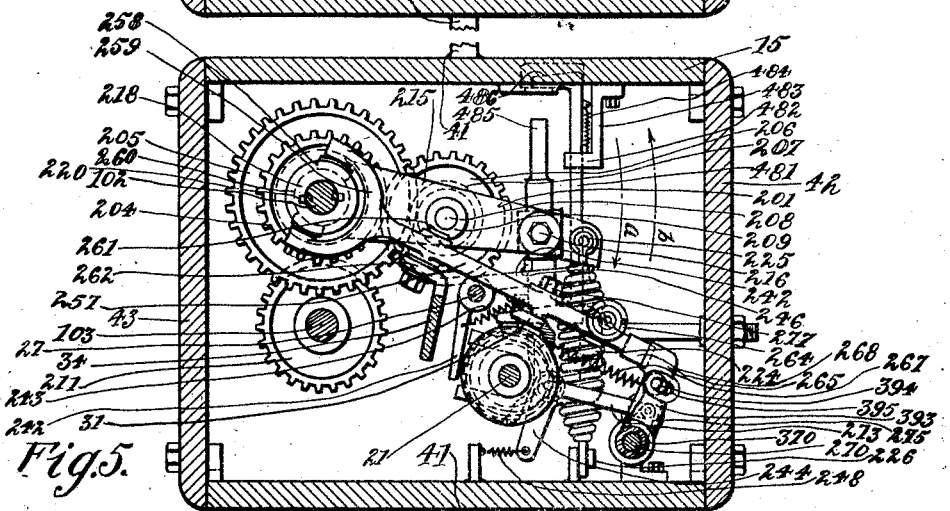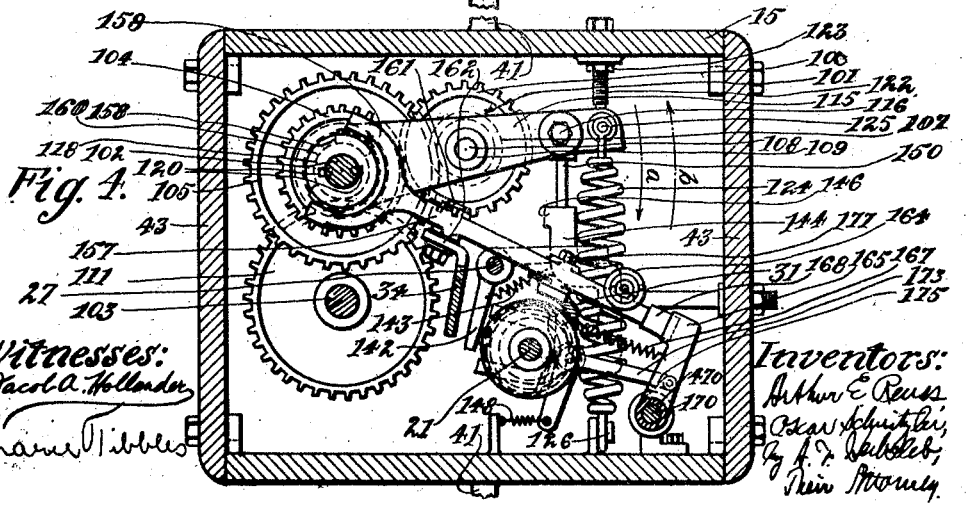

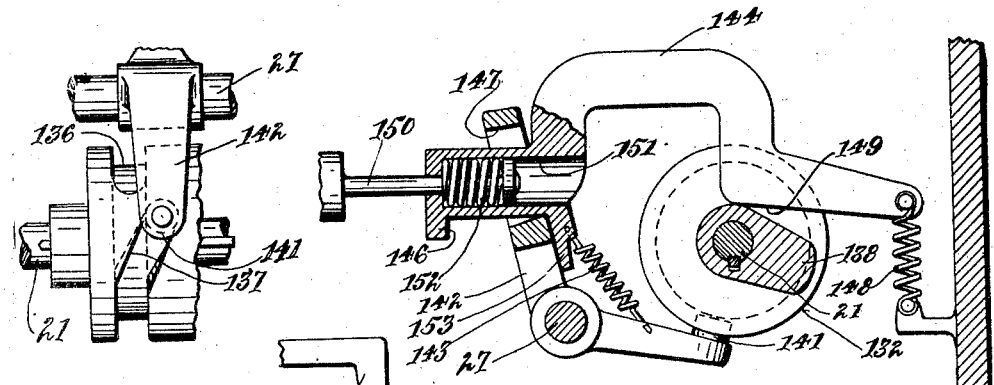
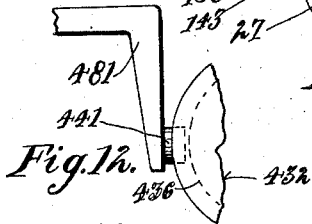
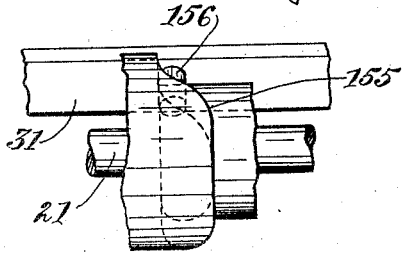
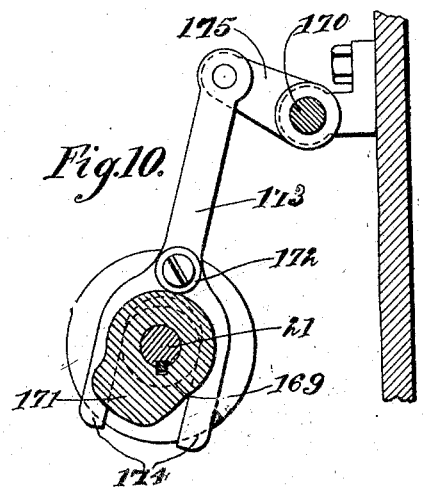
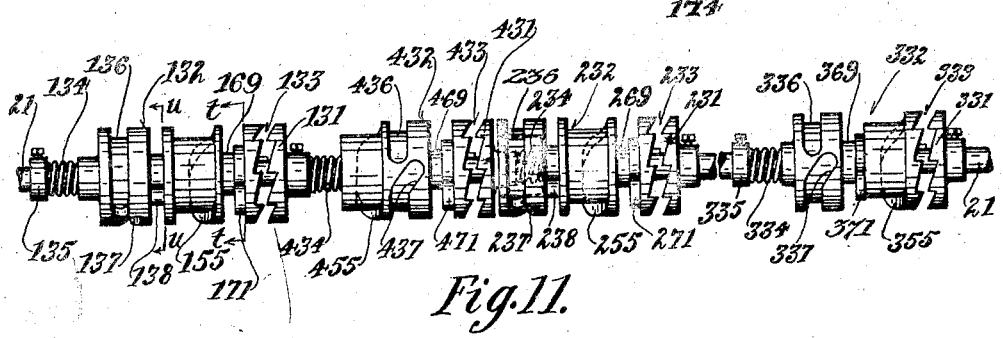

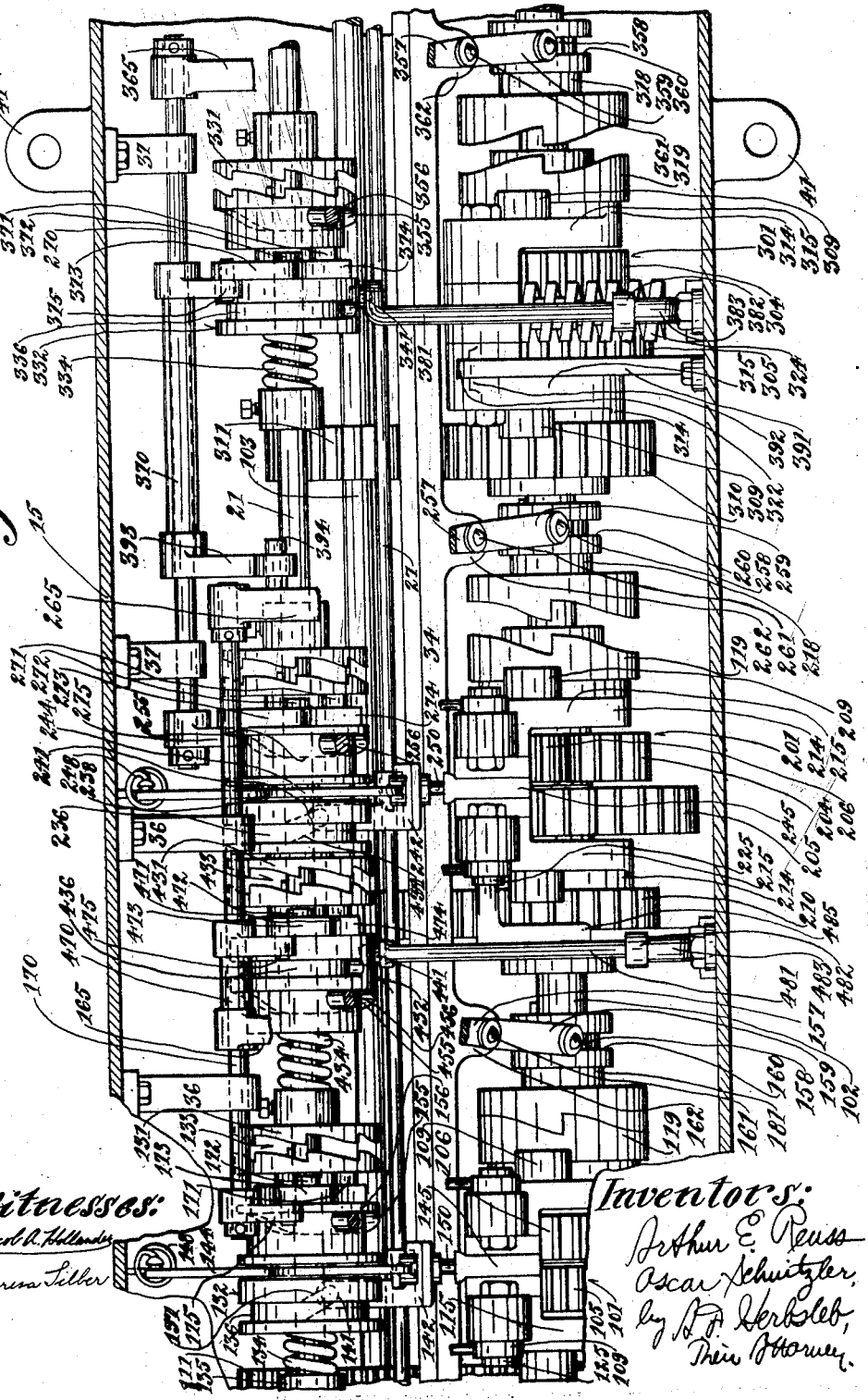

UNITED STATES PATENT OFFICE.

ARTHUR E. REUSS, OF CINCINNATI, AND OSCAR SCHNITZLER, OF REMINGTON, OHIO.

GEARING.

1,034,145.   Specification of Letters Patent.   Patented July 30, 1912.

Application filed May 1, 1911. Serial No. 624,294.

*To all whom it may concern:*

Be it known that we, ARTHUR E. REUSS and OSCAR SCHNITZLER, citizens of the United States, residing, respectively, in Cincinnati and at Remington, in the county of Hamilton and State of Ohio, have jointly invented certain new and useful Improvements in Gearing, of which the following is a specification.
Our invention relates to gearing and has for its object primarily the provision of novel means whereby automatic change in the transmission is effected, and is primarily applicable in relations where change in speed of transmission is desirable. Our invention is further applicable in relations where varying conditions of load obtain, and the conditions obtaining in the driving of an automobile may be instanced as an example in which our improved mechanism is readily applicable. Instancing the conditions obtaining in the propulsion of an automobile, it may be stated that various grades may be encountered in the course over which the automobile travels, or the course may be a level course.

It is the object of our invention to provide novel means whereby the various speed changes may be made automatically; further to provide means whereby the resistance to transmission reacts upon a movable transmitting member for automatically accomplishing change of speed; further to provide means embodying floating mechanism between the power supplying means and the power delivering means for controlling the speed of the latter; further to provide balancing mechanism in the power transmitting means for determining the speed of transmission; further to provide vibrator mechanism in the transmitting mechanism by means of which the transmission is automatically effected; further to provide a plurality of vibrator mechanisms and coöperating means whereby various speeds may be transmitted, controlled by the power applied; and, further, to provide means whereby a plurality of transmitting mechanisms have their operative relations controlled by the power applied with relation to the resistance encountered by the mechanism.

It is the object of our invention to further provide a floating mechanism for the power-transmitting train whose action initiates change in the transmitting train;
further to provide a plurality of floating mechanisms for the transmitting train of mechanisms; further to provide a floating mechanism for the transmitting gearing whose movement in one direction will initiate an increasing speed of transmission and whose movement in an opposite direction will initiate a decreasing speed of transmission; further to provide a plurality of floating mechanisms for transmitting gearing operative in sequence; further to provide intermediate and terminal floating mechanisms for transmitting gearing, the movements of said terminal floating mechanisms being respectively limited in given directions and being effective for effecting said intermediate floating mechanism by movements in opposite directions, and the said intermediate floating mechanism being effective for effecting both said terminal floating mechanisms by movements respectively in opposite directions, further to provide driving means and driven means with floating mechanism operative therebetween and embracing transmitting means and means for operatively connecting said driving means and driven means through said floating mechanism; further to provide such mechanism with cam mechanism for effecting change in driving relation; and further to provide automatically operating tripper mechanism for initiating operation of said cam mechanism.

We have herein shown and described and broadly claimed our invention.

A further exemplification of our invention is shown, described and claimed in our copending application Serial No. 627,805, filed May 17, 1911, to which reference is here made.

Our invention will be further readily understood from the following description and claims, and from the drawings, in which latter:

Figure 1 is a plan view of our improved device with the top cover removed. Fig. 2 is a cross-section of the same on the line 2—2 of Fig. 1. Fig. 3 is a vertical longitudinal section of the same on the irregular line y—y of Fig. 2. Fig. 4 is a cross-section of the same on the line x—x of Fig. 1. Fig. 5 is a cross-section of the same on the line w—w of Fig. 1. Fig. 6 is a cross-section of the same on the line v—v of Fig. 1. Fig. 7 is a bottom view showing the cam-groove connection for moving the cam-sleeve longitudinally. Fig. 8 is a cross-section of the tripping mechanism for the cam-sleeve, taken on a line corresponding to the line u—u of Fig. 11, with parts partly broken away. Fig. 9 is a rear view detail of the cam-mechanism for moving the clutch-bar longitudinally. Fig. 10 is a cross-section on a line corresponding to the line t—t of Fig. 11, showing the means for releasing the keeper for the clutch-lever. Fig. 11 is a side elevation of the cam-shaft with the cams thereon. Fig. 12 is a detail in side elevation of the releasing bar for the cam-sleeve; and Fig. 13 is a plan view of our improved device, with the ends partly broken away and with the top removed, and with part of the mechanism above the cam-shaft removed for exposing the cam-shaft, the rock-shafts, and the connections between the same.

101 represents a vibrator-frame operatively disposed between the driving and driven elements, instanced as a drive-shaft 102 and a driven-shaft 103. The drive-shaft may be driven in any suitable manner, as by the ordinary internal combustion motor of an automobile which has its fuel supplied through an ordinary throttle-valve operated by a usual throttle-lever for supplying more or less fuel to the motor and more or less power to the drive-shaft, dependent on the load-conditions encountered. The vibrator-frame is shown pivoted about the drive-shaft.

104 105 are gears whose rotary axes are shown as coincident with the pivotal axis of the vibrator-frame, and 106 107 are transmitting gears which rotate together and are mounted on the vibrator-frame, as by having axles 108 journaled in bearings 109 on the vibrator-frame and shown in train with the gears 104 105.

110 is a gear which rotates with the gear 105 and is meshed by a gear 11 secured to the driven shaft.

The gears 104 105 and 110 in the form shown rotate loosely about the drive-shaft, the gear 104 being secured to a sleeve 112 loose about the drive-shaft.

The pivotal axis of the vibrator-frame is preferably coincident with the rotary axes of gears 104 105 and the intermediate gears are preferably mounted on and move with the vibrator-frame, forming a floating mechanism in the train of gearing between the drive-shaft and the driven shaft. The gears 105 110 preferably rotate together as on a sleeve 113. The bearings 114 of the vibrator-frame are journaled about the sleeves 112 113, being located on arms 115 secured together adjacent their outer ends as by a tie-bolt 116 having a spacing-part 117 thereon between the arms.

118 is a movable clutch-sleeve between which and the sleeve 112 there is a clutch 119, the movable clutch-sleeve having spline-connection 120 with the drive-shaft. The gears 104 105 as shown have different speeds of movement imparted thereto and preferably have ball bearings 121 between the same.

In operation, when the clutch 119 is in engagement, the gear 104 will rotate in a given direction, acting on the gear 106 as a lever which is itself mounted on the vibrator-frame in such manner as to act on said frame as a lever, the line of driving force thus created tending to swing said vibrator-frame with the gears mounted thereon, in the example stated, about the gear 104 in planetary manner in the direction indicated by the arrow a. There is an opposing line of force from the driven member which acts on the gear 107 through the gear 105 as a lever, and opposes the swinging movement just stated of the vibrator-frame with the gears mounted thereon, causing a tendency of the vibrator-frame and the gears mounted thereon to swing in opposite direction, indicated by the arrow b. The line of driving force tends to swing said vibrator-frame in one direction while the resistance of the line of force of the driven member tends to swing said vibrator-frame in the opposite direction. The device is so arranged that a balancing position is provided for the floating mechanism. When either line of force preponderates beyond the balancing capacity of said floating mechanism, the latter will move in the direction induced by said line of force. The line of driven force tends to swing said vibrator-frame against a stop 122, preferably stationarily secured, as to the casing 15, shown as an inclosing box, the stop being shown as an adjustable stop in the form of a screw secured in place by a lock-nut 123. 124 is a spring which causes movement of said vibrator-frame in the direction of movement caused by the line of driving force, and to that extent amplifies said line of driving force. There is a pair of these springs shown, acting on the vibrator-frame at its respective sides and articulated therewith on bolts 125 and suitably secured to the casing as at 126.

In the present exemplification we have shown a vibrator-frame employed in each speed transmission, the vibrator-frame 101 being employed in low-speed transmission, with the line of driven force overbalancing the spring 124 and the balancing capacity of said vibrator-frame, the vibrator-frame being received against the stop 122, the driven agency being assumed to be proceeding under full load at slow speed. A further vibrator-frame is shown at 201, employed in intermediate speed transmission, and one at 301 employed in high speed transmission. The movement of the vibrator-frame or floating mechanism is provided to cause initiation of change in speed transmission. The means for causing changes in speed transmission exemplified in the present application, and details of mechanism will now be described.

The drive-shaft is shown journaled in the casing in bearings 16 and the driven shaft is shown journaled in bearings 17 in the casing.

21 is a cam-shaft journaled for instance in the casing in bearings 22. It is normally driven by the drive-shaft, as by means of a gear 23 on the drive-shaft, a gear 24 on the cam-shaft, and intermediate gears 25, 26.

131 is a clutch-sleeve fast on the cam-shaft and 132 is a cam-sleeve loose on the cam-shaft and slidable thereon toward and from the clutch-sleeve, these sleeves having a clutch 133 between the same, which we shall term a cam-clutch, the cam-sleeve being normally urged toward the clutch-sleeve for engaging the clutch, by a spring 134 received about the cam-shaft between a collar 135 and the cam-sleeve. The cam-sleeve has a cam 136 thereon, shown as a groove, the major part of which is annular about the sleeve, terminating however in an offset portion 137. It further preferably has a cam 138 thereon.

141 is a pin received in the cam-groove 136 for positioning the cam-sleeve longitudinally. It is shown on a bell-crank lever 142 pivoted on a rod 27 received in bearings 28 in the casing and normally urged toward the cam-sleeve by a spring 143.

144 is a trip articulated to the vibrator-frame, as by having a bearing 145 received about the spacing-part 117, and has a shoulder 146 thereon arranged to engage the lever 142 upon the contraction of the spring 124 for disengaging the pin 141 from the walls of the cam-groove 136. The trip is guided in a slot 147 in the lever 142 and is normally urged toward the cam 138 by a spring 148. It has an engaging part 149 thereon for the cam 138, the latter cam acting to disengage the trip from the lever 142, the sequence of operation being a tripping of the lever 142 by the trip 144, thereby releasing the cam-sleeve 132 for engaging the cam-clutch 133, whereby the cam-sleeve 132 is rotated for instance one revolution. After tripping of the lever 142, the cam 138 promptly acts to release the trip 144, at once permitting the pin 141 to reënter the annular portion of groove 136 for disengaging the clutch 133 when the pin enters the offset portion 137 of said groove.

For permitting the range of movement of the vibrator-frame required and limited movement of the tripping parts, we prefer to make the tripping part with a spaced connection shown as a stem 150 received in a socket 151, with a spring 152 between said parts for permitting extension and contraction of the same, the lug 153 of said trip bearing against the lever 142 when the parts are in extension. The bar 31 is a clutch-bar for the main or drive-clutches, and is slidable longitudinally in bearings 32 in the casing.

The cam-sleeve further has a cam 155 thereon and the bar 31 has a roller 156 thereon adapted to be engaged by the cam 155 upon rotation of the cam-sleeve for moving the bar 31 longitudinally.

157 is a lever having operative engagement with the drive-clutch sleeve 118, as by having shoes 158 in a fork 159 thereof received in an annular groove 160 in said clutch-sleeve, the lever being pivoted on a pivot 161 received in a bracket 162 of a bar 34 secured to the casing, the ends thereof being bracketed from the sides of the casing by brackets 35. The clutch lever 157 is normally urged for engagement of the clutch 119 by means of a spring 164 held between said lever and the casing, and the clutch is held in disengaged position by means of a keeper 165 engaging the shoulder 166 on the lever. The keeper is normally urged toward the lever by a spring 167, the keeper resting on a positioning face 168 on the lever when the latter is disengaged from the keeper for permitting ready engagement between the keeper and shoulder upon movement of the lever for engagement of the clutch 119. The keeper is on a rock-shaft 470. The keeper 165 is operated in manner to be presently described.

The cam-sleeve 132 is also provided with a cam 171 engaging a roller 172 on a link 173 having a positioning fork 174 received in an annular groove 169 about the cam-sleeve and articulated to an arm 175 on a rock-shaft 170 for operating the keeper 265 of the vibrator mechanism 201 for permitting engagement of the clutch 219, when there is a step in speed from the low to the intermediate speed mechanism. The connections of the trip 144 and link 173 have sufficiently loose fit to permit longitudinal movement of the cam-sleeve as stated.

The clutch-bar 31 is operative to disengage any main or drive-clutch which is in engaged relation at each operation of said clutch-bar without disturbing the disengaged relation of any other drive-clutch, except such as shall be operated on by the proper cam for that purpose, which is permitted by the spaced connections, shown as slots 176, 276 and 376, and pins 177, 277 and 377 between said clutch-bar and the drive-clutch levers, engagement of the clutches being induced by the springs 164, 264, 364, acting on the respective clutch-levers 157, 257, 357, when the keepers 165, 265 and 365 for those levers are disengaged by the tripping mechanism of any particular floating mechanism. The clutch-bar is held in normally retracted relation by the spring of that main-clutch lever whose clutch is in temporarily engaged relation.

When the power applied is greater than sufficient to maintain the vibrator-frame in its power delivering relation, the vibrator-frame will swing in the direction of the power-receiving end of the line of force applied thereto, and will cause the trip 144 to trip the lever 142, thereby causing the cam-clutch 133 to be engaged under influence of the spring 134. As soon as the cam-clutch is engaged, the cam-sleeve 132 will turn with the cam-shaft, the cam 155 moving the bar 31 longitudinally for disengaging the clutch 119, whereupon the cam 138 will engage the engaging part 149 of the trip 144, moving the shoulder 146 thereon out of engagement with the pin-lever 142, causing the pin to be received in the annular part of the cam-groove 136 so that, when the said pin is received in the off-set portion 137 of said cam-groove, the cam-clutch 133 will be disengaged for again bringing the cam-sleeve 132 into a position of rest. The keeper 265 will also have been rocked for disengaging the clutch-lever 257 and permitting engagement of the clutch 219 for causing transmission at the speed of next higher order.

201 is a vibrator-frame in connection with which, in the present exemplification of our invention, various parts operate similar to those which operate in connection with the vibrator-frame 101, the said parts in connection with the vibrator-frame 201 being designated by similar numerals advanced however into the series of 200, and part of which have been hereinbefore enumerated. The vibrator-frame 201 is however, preferably also provided with an additional cam-clutch and cam-sleeve and parts therefor designated by similar numerals in the series of 400, the cam-sleeve tripping mechanism thereof preferably however differing in construction.

It will be noted that the cam-sleeve trip 144 and lever 142 operating in connection with the vibrator-frame 101 serves to advance the speed in an increasing step from low to intermediate speed, and that the cam-sleeve trip 244 and lever 242 operating in connection with the vibrator-frame 201 serve to advance the speed in a further increasing step from intermediate to high speed. It will be noted further that the movements of the vibrator-frames for increasing steps of speed have been in directions in the present exemplification, from left to right, as indicated by the arrow a.

It is desirable that speed-change shall also take place in decreasing steps from high to intermediate and from intermediate to low, in accomplishing which there is preferably a movement of the vibrator-frames effected in opposite direction, from right to left, in the direction of the arrow b, for accomplishing which we provide the vibrator-frames 201 and 301 with reversely operating trips which we shall now describe.

Referring to the vibrator-frame 201 there is present in connection therewith a clutch-sleeve 431 fast on the cam-shaft and a longitudinally slidable cam-sleeve 432 having a clutch 433 between the same. The cam-sleeve 432 has thereon a cam 436 in the form of a groove having an off-set portion 437, a cam 455 for the roller of the longitudinally slidable bar 31, and a cam 471 for operating the link 473 which connects with the keeper 165.

441 is a pin received in the cam-groove 436 and is on a bar 481 slidable longitudinally in a bearing 482 on a bracket 483 secured to the casing, the bar being retracted by a spring 484. A trip 485, in the form of a rod extending rearwardly from the vibrator-frame 201, is arranged to engage a heel 486 on said bar for releasing the pin 441 from the cam-groove for permitting engagement of clutch 433 under influence of spring 434. When the cam-sleeve turns, the clutch 219 is disengaged and the clutch 119 is engaged, the vibrator arm 201 retreating instantly from the heel 486 under influence of the springs 224.

The vibrator-frame 301 is preferably provided with similar parts to those last described, designated by similar reference numerals in the series 300, this latter vibrator-frame preferably having a compression-spring 324 acting thereon and limited in one direction of its movement by a stop 322 shown in the form of a hook on a bracket 391 secured to the casing and received over a shoulder 392 on the vibrator-frame.

It will be noted that the stops of the vibrator-frames 101 103 operate to limit movement of said vibrator-frames in given directions, which are relatively opposite directions, and that yield thereof is permitted in opposite directions for transferring transmission from these end or terminal vibrator-frames, to the intermediate vibrator-frame, and further that the intermediate vibrator-frame is permitted to yield or float in both directions beyond a given median point for transferring transmission from said intermediate to either of said terminal vibrator-frames, the transference of transmission however taking place in sequence in increasing or decreasing speed-values.

The springs for the respective vibrator-frames preferably increase in power in inverse proportion to the speeds transmitted through said vibrator-frames. Thus the springs 124 for the low-speed vibrator-frame 101 are of greater resisting qualities than the springs 224 of the intermediate speed vibrator-frame 201, while the springs 224 for the latter are of greater resisting qualities than the spring 324 of the high-speed vibrator-frame 301.

In ascending ratios of speed the cam 171 is arranged to rock the rock-shaft 170 and the keeper 265, or the cam 271 is arranged to rock the rock-shaft 270 and the keeper 365. In descending ratios of speed the cam 371 is arranged to rock the rock-shaft 370 and the arm 393 which is connected with the keeper 265 by a spaced connection shown as a pin 394 received in a slot 395, or the cam 471 is arranged to rock the rock-shaft 470 and the keeper 165. The rock-shafts 470 and 370 are shown as hollow shafts received about the rock-shafts 170 and 270 journaled respectively in bearings 36 and 37 on the casing.

The train of gearing in conjunction with each of the vibrator-frames is arranged to impart a different speed between the driving shaft and the driven shaft at a given speed of the driving shaft. Thus in the exemplification, the train of gearing in connection with the vibrator-frame 101 will transmit a low speed, the train of gearing in connection with the vibrator-frame 201 will transmit an intermediate speed, and the train of gearing in connection with the vibrator-frame 301 will transmit a high speed to the driven shaft.

Mechanism is provided for automatically transferring the connection between the drive-shaft and the driven shaft through selective ones of said trains of mechanisms, the changes however taking place preferably in sequential order up or down, and this automatic changing is determined by the power applied to the drive-shaft in relation to the resistance encountered, so that the speeds of the driven shaft and trains of transmission at given resistances may be automatically varied by the power applied, and the speeds of the driven shaft upon application of a given power may be varied in relation to the resistances encountered. Thus assuming that our improved mechanism is applied for driving an automobile and that the automobile is traveling on a level stretch of ground in which the tractive resistances are constant, or substantially so, the gear-train through which the automobile will receive its power will be dependent on the amount of power supplied to the drive-shaft, accomplished for instance by the amount of fuel in the form of a suitable mixture of gas or gasolene or other burning or combustible oil and air supplied to the engine through the throttle valve by manipulation of the throttle-lever.

In the exemplification stated, the driving torque will be exerted in the direction of the arrow $a$ and the resistance torque will be exerted in the opposite direction, namely in the direction of the arrow $b$. Assuming that the vehicle is traveling on a level stretch of ground with but a small amount of fuel supplied through the throttle, sufficient to propel the vehicle at its low speed through the mechanism of vibrator-frame 101, the vibrator-frame 101 will be adjacent to its limit of movement in the direction of the delivering end of the line of power exerted upon the train of gearing employed in connection with the vibrator-frame 101, with the springs for the vibrator-frame in distended relation, the tendency of these springs being to move the vibrator-frame toward its opposed limit of movement toward the applying end of said line of power. If now additional power be supplied to the engine by opening the throttle, the torque of power application will overcome the torque of power resistance of the train of gearing at the vibrator-frame 101 and cause tripping of the cam-sleeve, whereby the clutch connecting the drive-shaft with said train of gearing is released, and the clutch for the train of gearing in connection with the vibrator-frame 201, conveying the intermediate speed, is engaged, a similar effect being accomplished with relation to the train of gearing in connection with the vibrator-frame 301, if a still greater supply of fuel is given to the engine by the opening of the throttle for producing the high speed. In this manner any of the speeds produced by the various trains of gearing may be imparted and the transition from one speed train to another takes place automatically, determined by the amount of power supplied. If traveling at high speed, and a lower speed should be desired, the manipulation of the throttle for supplying less fuel will automatically cause change of the transmission through the train of gearing in connection with the vibrator-frame 301 respectively to the trains of gearing in connection with the vibrator-frames 201 and 101. Corresponding changes in transmission are obtained where a constant supply of fuel to the engine is provided, that is, a constant power is applied to the drive-shaft, and the resistances vary. Thus if the automobile is changing from traveling on a level tract of ground to one having a moderate grade, and assuming that the automobile is being propelled at high speed, that is, that the propulsion is taking place through the high speed train of gearing, and an upgrade is encountered, which it would be impossible for the power to negotiate, under the amount of fuel supplied, at such high speed, the transmission would be automatically shifted from the train of gearing in connection with the vibrator-frame 301 to the train of gearing in connection with the vibrator-frame 201 and if a more abrupt ascent were encountered, an automatic change will take place to the low speed train of gearing in connection with the vibrator-frame 101.

The vibrator-frame and gears mounted thereon float under the influence of the power-applying and power-resisting forces.
The floating movements of the end or terminal floating mechanisms are shown limited in given directions, their movements in opposite directions influencing speed change. The floating mechanism, instanced herein as the intermediate floating mechanism, is so arranged that its floating movements in both directions influence speed change, instanced as an increased speed in a given direction of movement and as a decreased speed in the opposite direction of movement. The total movement permitted each vibrator-frame in each direction is preferably restricted.

The casing may be suitably supported, as on brackets 41, and have a removable top 42 and a removable bottom 43.

Having thus fully described our invention, what we claim as new and desire to secure by Letters Patent is:

1. In speed changing mechanism, the combination of speed change driving parts embracing a movable member, power operating means for moving said movable member for effecting change of speed, said power operating means being normally in inactive relation during transmission of power by said driving parts, and tripper means for causing active relation of said power operating means.

2. In speed changing mechanism, the combination of speed change driving parts embracing a movable member, power operating means for moving said movable member arranged for having operative connection with one of said driving parts and said movable part, said operative connection being normally in inactive relation during transmission of power by said driving parts, and tripper mechanism for causing active relation in said driving connection.

3. In speed changing mechanism, the combination of power transmitting elements embracing a driving member, a driven member and speed change transmitting members, said members embracing a plurality of movable members, power operating means for sequentially moving said movable members and having operative connection with one of said first-named members and embracing a driving connection normally inactive during transmission of power by said first-named members, and tripper mechanism for causing active relation in said last-named driving connection.

4. Gearing embracing a plurality of floating mechanisms acted on by opposing forces in said gearing for causing floating thereof, and means acted on by said floating mechanisms for causing change of operative relation between said floating mechanisms.

5. In gearing, the combination of a vibrator-frame, a gear mounted thereon, a plurality of gears therefor having rotary axes substantially coincident with the axis of vibration of said vibrator-frame, driving means and a driven member having operative connection with said gears and acting for applying opposing forces to said vibrator-frame, and means acted on by said vibrator-frame for effecting change in said operative connection.

6. In gearing, the combination of a vibrator-frame, a gear mounted thereon, a plurality of gears therefor having rotary axes substantially coincident with the axis of vibration of said vibrator-frame, driving means and a driven member having operative connection with said gears and acting for applying opposing forces to said vibrator-frame, said operative connection for said driving means embracing a clutch, and means acted on by said vibrator-frame for operating said clutch.

7. In combination, gearing embracing floating mechanisms comprising transmitting members moved in floating manner by opposing lines of force and means acted on by said floating mechanisms for shifting transmission from one to the other of said floating mechanisms.

8. In combination, a plurality of floating mechanisms, a driving member, a driven member, each of said floating mechanisms embracing transmitting gearing having operative connection with said driving and driven members comprising an interrupting element, means for actuating said interrupting elements, and means actuated by said respective floating members for initiating operation of said last-named means, the floating mechanism having uninterrupted operative connection with said driving and driven members moved in floating manner by opposing forces from said driving and driven members.

9. In combination, a plurality of vibrator-frames, transmitting gearing for each of said vibrator-frames part of which moves with said respective vibrator-frames, a driving member and a driven member with which said respective gearings have operative connection comprising an interrupting means, and operating means for said several interrupting means common to all said interrupting means, said operating means having operative relation with all said vibrator-frames.

10. In combination, a plurality of vibrator-frames, transmitting gearing for each of said vibrator-frames part of which moves with said respective vibrator-frames, a driving member and a driven member with which said respective gearings have operative connection comprising an interrupting means, cams for said vibrator-frames, means actuated by said vibrator-frames for initiating movement of said cams, operating means for said several interrupting means common to all said interrupting means, said operating means having operative connection with each of said cams.

11. In combination, a plurality of floating transmitting mechanisms, each of which has a different speed-transmitting effect, a resilient resistance member for each of said floating mechanisms whose resistance effects increase in inverse order to the order of speed-transmitting effects of said floating mechanisms.

12. In combination, a plurality of floating transmitting mechanisms each of which has a different speed-transmitting effect and embracing terminal floating mechanisms and an intermediate floating mechanism, and connections therebetween having operative relation to each of said floating mechanisms in sequential order.

13. In combination, a plurality of floating transmitting mechanisms each of which has a different speed-transmitting effect and embracing terminal floating mechanisms, and an intermediate floating mechanism, connections therebetween having operative relation to each of said floating mechanisms in sequential order, and resilient means for normally urging said respective floating mechanisms toward one of the ends of their ranges of movement.

14. In combination, a plurality of floating transmitting mechanisms each of which has a different speed-transmitting effect and embracing terminal floating mechanisms and an intermediate floating mechanism, connections therebetween having operative relation to each of said floating mechanisms, said floating mechanisms floatingly moved by opposing transmitting forces therein, said terminal floating mechanisms acting on said connections by movements in opposite directions for transferring transmitting effect to said intermediate floating mechanism, and said intermediate floating mechanism acting on said connections by movement thereof in both directions for transferring transmitting effects respectively to said terminal floating mechanisms.

15. In combination, a plurality of floating transmitting mechanisms each of which has a different speed-transmitting effect and embracing terminal floating mechanisms and an intermediate floating mechanism, connections therebetween having operative relation to each of said floating mechanisms, said floating mechanisms floatingly moved by opposing transmitting forces therein, said terminal floating mechanisms acting on said connections by movements in opposite directions for transferring transmitting effect to said intermediate floating mechanism, said intermediate floating mechanism acting on said connections by movement thereof in both directions for transferring transmitting effects respectively to said terminal floating mechanisms, and resilient means for normally urging all said floating mechanisms in a given direction of movement.

16. In combination, a driving member, a driven member, floating transmitting mechanism operative therebetween, resilient means for urging said transmitting mechanism in a given direction, means operatively connecting said driving member and driven member through said floating transmitting mechanism, and means embracing cam mechanism and tripper mechanism actuated thereby for moving said last-named means.

17. In power transmitting mechanism, the combination of a power applying member, a power resisting member, and a plurality of trains of transmitting mechanism between said members embracing floating-mechanism having operative relation with said transmitting mechanism, for changing the transmission from one to the other of said trains by the movement of said floating mechanism caused by the relation of opposing power-applying and power-resisting forces applied thereto.

18. In power transmitting mechanism, the combination of a power applying member, a power resisting member, and a plurality of trains of transmitting mechanism between said members embracing floating mechanism having operative relation with said transmitting mechanism for changing the transmission from one to the other of said trains by the movement of said floating mechanism caused by the relation of opposing power-applying and power resisting forces applied thereto, and means for normally urging said floating mechanism in the line of one of said forces.

19. In power transmitting mechanism, the combination of a driving member, a driven member, a vibrator-frame, transmitting gearing and interrupting means therefor between said members, part of said transmitting gearing mounted on and moving with said vibrator-frame, a cam, a clutch therefor, means actuated by said vibrator-frame for causing engagement of said clutch, and connecting means between said cam and interrupting means for causing operation of said interrupting means.

20. In power transmitting mechanism, the combination of a vibrator-frame, gearing therefor, a main clutch for the latter, a cam-sleeve, a cam-clutch, a positioning part for said cam-sleeve, a trip for the latter operated by said vibrator-frame for releasing said cam-sleeve and engaging said cam-clutch, a lever for said main clutch, a shiftable bar for moving said lever, said cam-sleeve having a cam thereon and said bar provided with an engaging part therefor for moving said lever, substantially as described.

21. In power transmitting mechanism, the combination of a vibrator-frame, gearing therefor, a main clutch for the latter, a cam-sleeve, a cam-clutch, a positioning part for said cam-sleeve, a trip for the latter operated by said vibrator-frame for releasing said cam-sleeve and engaging said cam-clutch, said cam-sleeve having a cam thereon for releasing said trip from said positioning part, a lever for said main clutch, a shiftable bar for moving said lever, said cam-sleeve having a cam thereon and said bar provided with an engaging part therefor for moving said lever, substantially as described.

22. In power transmitting mechanism, the combination of a vibrator-frame, gearing therefor, a main clutch for the latter, a cam-sleeve, a cam-clutch, a positioning part for said cam-sleeve, a trip for the latter operated by said vibrator-frame for releasing said cam-sleeve and engaging said cam-clutch, said trip comprising a plurality of parts having spaced connection therebetween, a lever for said main clutch, a shiftable bar for moving said lever, said cam-sleeve having a cam thereon and said bar provided with an engaging part therefor for moving said lever, substantially as described.

23. In power transmitting mechanism, the combination of a vibrator-frame, gearing therefor, a main clutch for the latter, a cam-sleeve, a cam-clutch, a positioning part for said cam-sleeve, a trip for the latter operated by said vibrator-frame for releasing said cam-sleeve and engaging said cam-clutch, said cam-sleeve having a cam thereon for releasing said trip from said positioning part, said cam-sleeve having a cam thereon with an off-set portion with which said positioning part engages for releasing said cam-clutch, a lever for said main clutch, a shiftable bar for moving said lever, said cam-sleeve having a cam thereon and said bar provided with an engaging part therefor for moving said lever, substantially as described.

24. In power transmitting mechanism, the combination of a vibrator-frame, resilient means for normally urging said vibrator-frame in a given direction, gearing for said vibrator-frame, a main clutch for the latter, a cam-sleeve, a cam-clutch, a positioning part for said cam-sleeve, a trip for the latter operated by said vibrator-frame when moved in the direction urged by said resilient means for releasing said cam-sleeve and engaging said cam-clutch, a lever for said main-clutch, a shiftable bar for moving said lever, said cam-sleeve having a cam thereon and said bar provided with an engaging part therefor for moving said lever, substantially as described.

25. In power transmitting mechanism, the combination of a vibrator-frame, resilient means for normally urging said vibrator-frame in a given direction, gearing for said vibrator-frame, a main clutch for the latter, a cam-sleeve, a cam-clutch, a positioning part for said cam-sleeve, a trip for the latter operated by said vibrator-frame when moved in a direction opposite to that urged by said resilient means for releasing said cam-sleeve and engaging said cam-clutch, a lever for said main clutch, a shiftable bar for moving said lever, said cam-sleeve having a cam thereon, and said bar provided with an engaging part therefor for moving said lever, substantially as described.

26. In power transmitting mechanism, the combination of a vibrator-frame, resilient means for normally urging said vibrator-frame in a given direction, gearing for said vibrator-frame, a main clutch for the latter, a pair of cam-sleeves, a cam-clutch for each, a positioning part for each cam-sleeve, a trip for each positioning part, one of said trips operated by said vibrator-frame when moved in the direction urged by said resilient means and the other of said trips operated by said vibrator-frame when moved in a direction opposite to that urged by said resilient means for releasing said respective cam-sleeves and engaging said respective cam-clutches, a lever for said main clutch, a shiftable bar for moving said lever, said respective cam-sleeves having cams thereon and said bar provided with engaging parts therefor for moving said lever, substantially as described.

27. In power transmitting mechanism, the combination of a plurality of vibrator-frames, a train of gearing for each of said vibrator-frames, a clutch for each train of gearing, a lever for each clutch, a keeper for each lever, a cam-sleeve for each vibrator-frame having operative connection with its vibrator-frame for initiating movement thereof, each of said cam-sleeves having a cam for one of said keepers, a lever-bar for said levers, and each of said cam-sleeves provided with a cam for operating said lever-bar, substantially as described.

28. In power transmitting mechanism, the combination of a plurality of vibrator-frames, a train of gearing for each of said vibrator-frames, a clutch for each train of gearing, and means actuated from each of said vibrator-frames for causing engagement of one of said clutches and release of the balance of said clutches, substantially for the purpose described.

In testimony whereof, we have signed our names hereto in the presence of two subscribing witnesses.

ARTHUR E. REUSS.
OSCAR SCHNITZLER.

Witnesses:
  LILLIAN BURNETT,
  AMES P. FOSTER.